United States Patent [19]

Michimoto et al.

[11] Patent Number: 5,011,810

[45] Date of Patent: Apr. 30, 1991

[54] PLATE-SHAPED CATALYST AND METHOD OF PRODUCING SAME

[75] Inventors: Takashi Michimoto; Yukinari Nakamoto; Kazuhiko Kuwada; Nobuyoshi Ishida, all of Hiroshima, Japan

[73] Assignee: Babcock Hitachi Kabushiki Kaisha, Tokyo, Japan

[21] Appl. No.: 335,422

[22] Filed: Apr. 10, 1989

[30] Foreign Application Priority Data

Oct. 7, 1988 [JP] Japan ............................ 63-253037

[51] Int. Cl.$^5$ ..................... B01J 32/00; B01J 35/04
[52] U.S. Cl. ............................. 502/439; 502/527
[58] Field of Search ............ 502/439, 527; 29/6.2, 29/527.4; 427/247, 422

[56] References Cited

U.S. PATENT DOCUMENTS

| | | | |
|---|---|---|---|
| 4,119,701 | 10/1978 | Fedor et al. | 502/527 X |
| 4,567,630 | 2/1986 | Ishida et al. | 29/6.2 |
| 4,847,234 | 7/1989 | Hums | 502/527 X |

FOREIGN PATENT DOCUMENTS 2853023  6/1979  Fed. Rep. of Germany ...... 502/527

*Primary Examiner*—W. J. Shine
*Attorney, Agent, or Firm*—Fay, Sharpe, Beall, Fagan, Minnich & McKee

[57] ABSTRACT

A plate-shaped catalyst for denitration of exhaust gases has a surface roughened expanded metal base strip that is coated on both surfaces with a catalytic layer. Conical convex and concave portions adjoining one another are pressed into the coated strip, and the surfaces of the coated layer are formed with wave-shapes having a predetermined pitch without substantially deforming the expanded metal strip. The plate-shaped catalysts are stacked on one another to form a catalytic unit using the convex and concave portions as spacers.

13 Claims, 5 Drawing Sheets

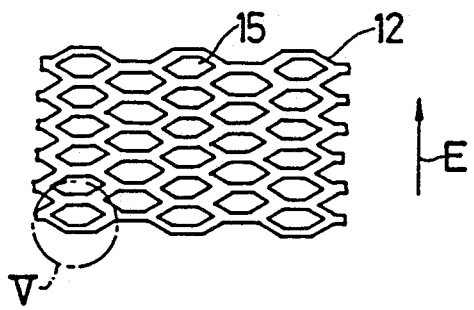
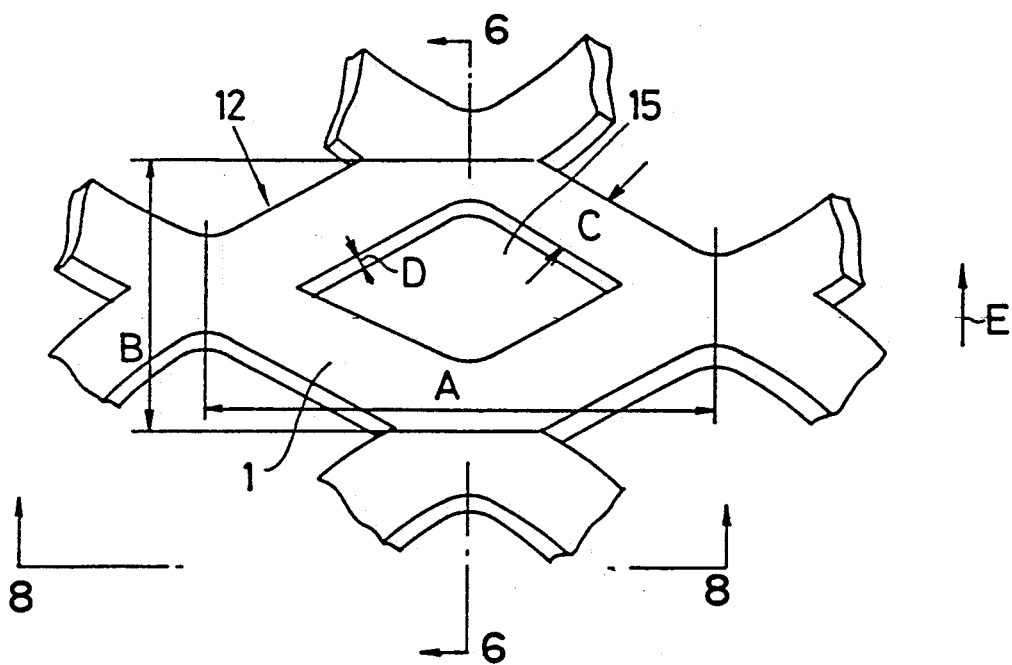
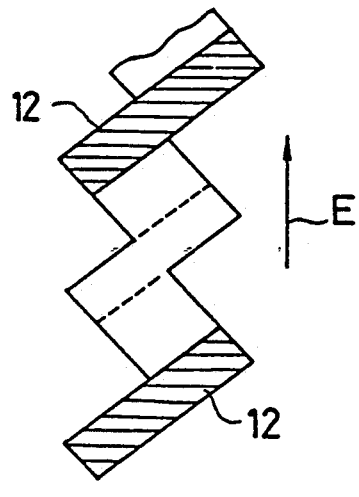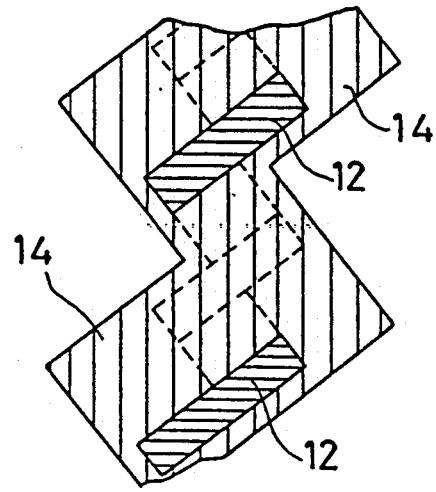

PLATE-SHAPED CATALYST AND METHOD OF PRODUCING SAME

BACKGROUND OF THE INVENTION

1. Field of the Invention

The present invention relates to a plate-shaped catalyst and a method of producing the same, and more particularly to a plate-shaped catalyst for denitration using an expanded metal strip as a base plate.

2. Description of the Related Art

U.S. Pat. No. 4,567,630 discloses a plate-shaped catalyst for denitration using an expanded metal strip as a base plate. A method for producing this plate-shaped catalyst mainly includes: a step of forming an expanded metal strip; a step of spray-coating molten metal onto the expanded metal strip to form roughened surfaces thereon; a step of coating a catalytic substance onto the thus surface-roughened expanded metal strip; a step of holding the catalyst coated between upper and lower sheets to protect the surfaces thereof; a step of applying pressure to the catalyst strip to closely attach the catalytic substance onto the roughened surfaces for flattening the surfaces out; a step of press-working the thus obtained catalyst strip to form it into a predetermined shape; and a step of cutting the catalyst strip to the specified length to obtain a plate-shaped catalyst. During the above-described steps, the plate-shaped catalyst strip which is prepared by coating the catalytic substance onto the expanded metal strip is pressed to form V-shaped ridges on both surfaces thereof. The shaped catalysts are obtained by cutting the catalyst strips and piling them up on each other by using the ridges as spacers, and to form a catalytic unit. When the catalyst unit is used as an exhaust gas denitrating catalytic unit, exhaust gases mixed with a reducing agent such as ammonia are passed through a multiplicity of channels formed by the ridges of the piled-up upper and lower plate-shaped catalysts, whereby nitrogen oxides (NOx) contained in the exhaust gases catalytically are reacted with ammonia in the exhaust gases, so that the exhaust gases can be purified.

In the aforesaid plate-shaped catalyst unit, the expanded metal strip is pressed to form the ridges. The ridges have a V-shape cross section, which function as the spacer. After coating the catalyst substance onto the expanded metal strip, the expanded metal strip is bent into the form that is V-shaped in cross-section, whereby the expanded metal strip is reduced in size in a direction of bending. For this reason, in order to obtain the plate-shaped catalyst unit having the predetermined length, it is necessary to use the expanded metal strip having a size that allows for the reduction in size due to the aforesaid pressing. For example, in order to finish the expanded metal strip to the width of 500 mm, it is necessary to use an expanded metal strip having a width of about 525 mm.

SUMMARY OF THE INVENTION

An object of the present invention is to provide a plate-shaped catalyst and a method of producing the same, wherein the size of the base strip, as it is, becomes equal to the size of the plate-shaped catalyst, and the catalytic surface area equal or is more than that of the conventional plate-shaped catalyst, without the expanded metal base strip being reduced in size during the formation of the plate-shaped catalyst.

The plate-shaped catalyst according to the present invention has: a surface-roughened expanded metal strip; a catalytic layer coated on the surfaces of the expanded metal strip to block openings formed in the expanded metal strip; and convex and concave portions adjoining one another at a predetermined distance on the expanded metal strip, and having the catalytic layer coated thereon; the surfaces of the catalytic layer are then formed with wave-shapes at a predetermined pitch. The invention further concerns the plate-shaped catalyst wherein a pitch of openings formed in said expanded metal strip in a direction of expanding is about 2 mm, a pitch of openings arranged in a direction perpendicular to the direction of expanding is about 4.5 mm and a pitch of said wave-shapes is about 2 mm.

The method of producing the plate-shaped catalyst according to the present invention includes: a step of coating a catalytic substance onto the surface-roughened expanded metal strip; a step of passing the expanded metal strip coated thereon with the catalytic substance through a pair of rolls having thereon wave-shapes arranged at a pitch of 1-3 mm and a plurality of convex and concave portions adjoining one another, wherein the pair of rolls are provided such that the wave-shapes and convex and concave portions are in mesh with each other; and of forming the surfaces of the catalytic layer on the expanded metal strip into the wave-shapes such that the expanded metal strip is not substantially deformed except for the convex and concave portions.

BRIEF DESCRIPTION OF THE DRAWINGS

FIG. 4 is a plan view showing the expanded metal strip that is the base strip of the plate-shaped catalyst according to the present invention;

FIG. 5 is an enlarged perspective view showing a portion V in FIG. 4;

FIG. 6 is a sectional view taken in the direction indicated by the arrows and along the line 6—6 in FIG. 5;

FIG. 7 is a sectional veiw showing a state in which a wave-shaped catalytic layer is formed in the direction of expanding of the expanded metal strip (a direction indicated by the arrow E in FIG. 6);

DETAILED DESCRIPTION OF THE PRESENT INVENTION

The present invention will be described in detail with reference to the accompanying drawings.

Figure 1:
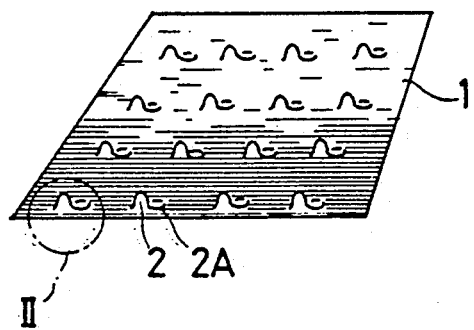
FIG. 1 is a perspective view showing an example of the plate-shaped catalyst according to the present invention.

Referring to FIG. 1, a plate-shaped catalyst 1 according to the present invention includes: a catalytic layer coated on the entire surface area of both sides of the surface-roughened expanded metal strip so as to block openings formed in the expanded metal strip; convex and concave portions 2 and 2A adjoining one another which are provided at a predetermined distance on the expanded metal strip having the catalytic layer coated thereon; and a plurality of wave-shapes 14 arranged at a predetermined pitch on the surfaces of the catalytic layer.

FIGS. 4 and 5 show the expanded metal strip 12 used in the present invention. Examples of dimensions shown in FIG. 5 are: 4.5 mm for an interval A (a pitch of openings arranged in a direction perpendicular to the direction of expanding E); 2.05 mm for an interval B (a pitch of openings arranged in a direction of expanding E); 0.75 mm for an interval C; and 0.2 mm for an interval D. The expanded metal strip can be available in the market. However, when slits are formed in a planar metal plate at a predetermined distance and the plate is expanded in a direction perpendicular to the slits (herein, referred to as the "direction of expanding E") to form openings 15 having a predetermined size, the expanded metal strip can be easily produced. This expanded metal plate thus obtained is spray-coated with a metal such as aluminum in order to allow the catalytic substance to be easily coated thereon, so that the surfaces thereof can be roughened.

Figure 8:
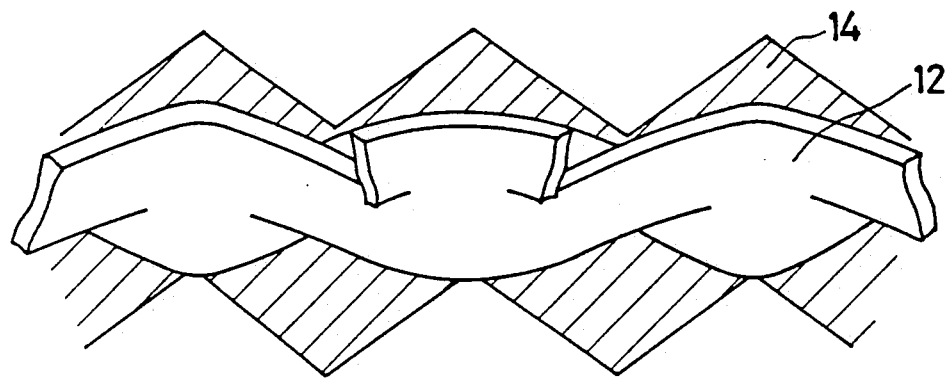
FIG. 8 is a sectional view taken in the direction indicated by the arrows and along the line 8—8 in FIG. 5, showing a state in which the wave-shaped catalytic layer is formed in a direction perpendicular to the direction of expanding of the expanded metal strip.

The catalytic substance is coated on the entire surface area of the both sides of the expanded metal strip thus surface-roughened in such a manner as to block the openings 15 formed in the expanded metal strip with the catalytic substance. This catalytic substance includes denitrating catalytic components such as Ti, V, Mo, W, etc., and besides, may further include a reinforcing component such as inorganic fibers when necessary. The catalytic substance is normally supplied in a plasticized state having 70-90 wt. % of water, which is easily formulated. The coating amount of the catalytic substance on the expanded metal strip is 60-90 wt. %, preferably 70-85 wt. %. This plate-shaped catalyst is passed between rolls 7 and 7A (Refer to FIGS. 3 and 9) having the wave-shapes arranged at a predetermined pitch and the convex and concave portions so as to form the wave-shapes on the surfaces of the catalytic layer, and simultaneously the convex and concave portions adjoining one another are formed on the expanded metal strip. By combining a direction of the wave-shapes of the wave-shape rolls with a direction of feeding the expanded metal strip, the wave-shapes shown in FIGS. 7 and 8 are formed. More specifically, FIG. 7 shows a case where the direction of the wave-shapes of the wave-shape rolls is aligned with the direction of expanding direction E of the expanded metal strip, whereby the catalytic layer 14 having generally uniform thickness is formed on the surfaces of the expanded metal strip. On the other hand, when the direction of the wave-shapes of the wave-shape rolls perpendicularly intersects the direction of expanding of the expanded metal strip as shown in FIG. 8, the wave-shapes are formed only by the catalytic layer being coated on both surfaces of the expanded metal strip. The pitch P (a distance from a crest to the following crest) of the wave-shapes of the catalyst itself according to the present invention is preferably 1.5–2.5 mm. Furthermore, the height of the wave-shape is preferably about 1–3 mm.

Figure 10:
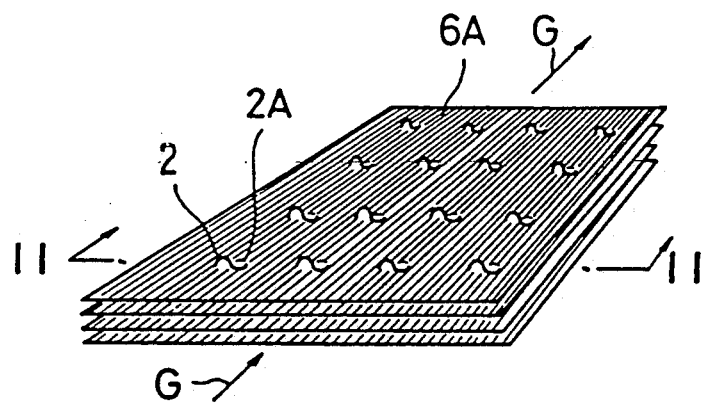
FIG. 10 is a perspective view showing a pile of the plate-shaped catalysts obtained by cutting the catalyst strip press-worked in FIG. 9.
Figure 11:
FIG. 11 is a sectional view taken in the direction indicated by the arrows along the line 11—11 in FIG. 10.

The convex portion 2 and the concave portion 2A are formed of conical shapes similar to each other. They are formed by the pair of pressing rolls 7 and 7A (having the wave-shapes and the conical convex and concave portions 16 and 16A equal in depth) at the same time as the formation of the wave-shapes, the wave-shapes and the convex and concave portions being in mesh with each other. The convex portions 2 and the concave portions, 2A, which are formed on the plate-shaped catalyst, preferably adjoin one another, since the convex portions and the concave portions advantageously do not meet with one another at the time the plate-shaped catalysts are piled up on each other, i.e. the convex and concave portions are used as the spacers as shown in FIG. 10. These convex portions 2 and concave portions 2A may be arranged in a zigzag manner in addition to the checkerboard manner as shown in FIG. 1.

An example of the method of producing the plate-shaped catalyst according to the present invention will be described with reference to FIG. 3. In this system, catalytic slurry, coating rolls 3 and 3A, wave-shape pressing rolls 7 and 7A and a cutting machine 8 are serially arranged, whereby a coating process of coating a catalytic substance 11, a pressing process and a cutting process are continuously performed on the expanded metal strip. Between the coating rolls 3 and 3A, papers or plastic sheets 4 are provided on and under the expanded metal strip, so that the catalytic substance is prevented from adhering to the coating rolls 3 and 3A, and the surfaces of the catalyst are finished flat. Also, between the wave-shape pressing rolls 7 and 7A, plastic sheets or papers (kraft paper, for example) 5 are provided on and under the catalyst strip, and the catalyst strip is pressed to densify it at the same time it is formed, so that the catalyst can be prevented from falling off and the catalytic substance can be prevented from adhering to the wave-shaped pressing rolls. The catalytic substance 11 is supplied onto the expanded metal strip which is fed between the coating rolls 3 and 3A, pressed between the coating rolls, and spread onto the undersurface of the expanded metal strip through the openings thereof, whereby the catalytic layer coats both surfaces of the expanded metal strip. The catalyst strip having been threaded through the coating rolls 3 and 3A is passed through the pressing rolls 7 and 7A having the wave-shapes and the convex and concave portions, whereby the catalytic strip is formed into the aforesaid predetermined shape. A plate-shaped catalyst 6 having been threaded through the wave-shape pressing rolls is cut with blades 10 in a cutting machine 8 to a predetermine length, whereby a plate-shaped catalyst 6A can be obtained. As the plastic sheet 4 or 5, it is preferable to use a sheet of polyethylene, polypropylene, polyester or the like.

Figure 2:
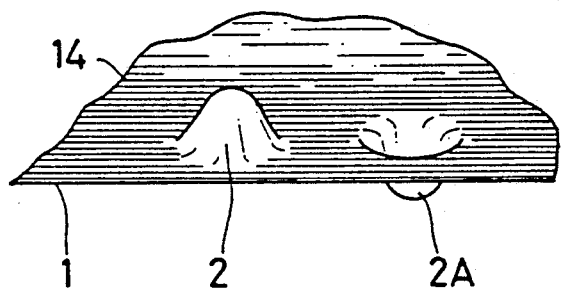
FIG. 2 is an enlarged view showing a portion II in FIG. 1.
Figure 9:
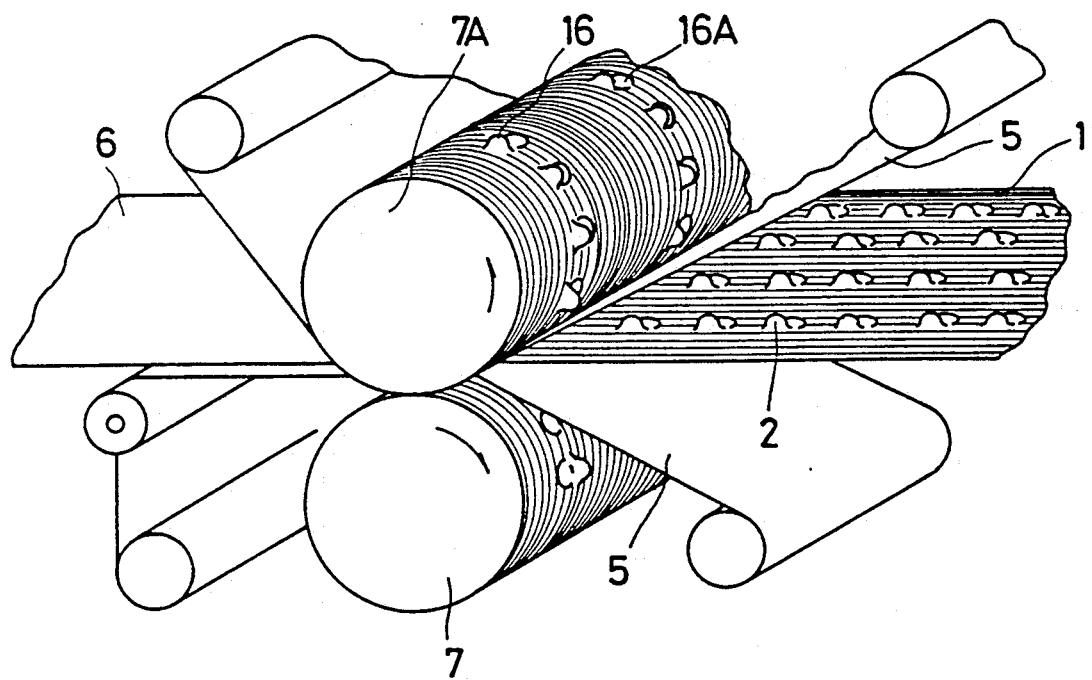
FIG. 9 is an explanatory view showing the step of passing the expanded metal strip having the catalytic substance coated thereon through the wave-shape rolls having the specified convex and concave portions for press-working the expanded metal strip.

FIG. 9 is the explanatory view showing the pressing rolls 7, 7A. Formed on the pressing rolls 7 and 7A are the wave-shapes, which are, V-shaped in cross section, at a pitch of 1.5-2.5 mm in a direction normal to the circumferential direction, and the conical convex portions 2 and concave portions 2A adjoining one another and spaced apart a predetermined distance. In this case, the base strip of the expanded metal strip having the integrally attached catalytic layer, is also deformed to a predetermined shape at the convex portions 2 and the concave portions 2A as shown in FIG. 2. However, with respect to other wave-shaped portions of the catalytic strip, only the catalytic layer on the surfaces is formed to provide the wave-shaped portions, and the expanded metal strip itself is not deformed into the wave-shapes. The pressure of the pressing rolls is suitably set in consideration of the above. The expanded metal strip as the base strip is partially deformed at the convex and concave portions and the wave-shapes are formed only on the catalytic layer as described above, so that the catalyst strip can be produced without changing the dimensions of the expanded metal strip.

In order to form the wave-shapes on the surfaces of the catalytic layer of the catalyst strip without substantially deforming the expanded metal strip as the base strip, it is preferable to form the wave-shapes having about a pitch one half the pitch of the openings of the expanded metal strip. This is because, as shown in FIGS. 7 and 8, the wave-shapes on the surfaces of the expanded metal strip itself meet with the wave-shapes formed on the catalytic layer, so that the adherability (peel strength and resistance to abrasion) is improved. FIG. 7 shows a case where the wave-shapes of the catalytic layer 14 are formed in the same direction as the expanding direction E of the expanded metal strip 12, and FIG. 8 shows a case where the wave-shapes of the catalytic layer 14 are formed in a direction perpendicular to the expanding direction E. In the case of FIG. 7, the catalytic layer is attached more firmly (in the more uniform thickness) to the surfaces of the expanded metal strip than the case of FIG. 8. In the case of FIG. 8, the catalytic layer is attached to the expanded metal strip, and is not of a uniform thickness, and, from the viewpoint of resistance to abrasion, the plate-shaped catalyst of FIG. 7 is superior to that of FIG. 8.

The wave-shapes of the pressing rolls shown in FIG. 9 are formed in the direction normal to the circumferential direction. However, so-called star-shaped rolls, in which the wave-shapes are formed in the circumferential direction, may be used.

Figure 3:
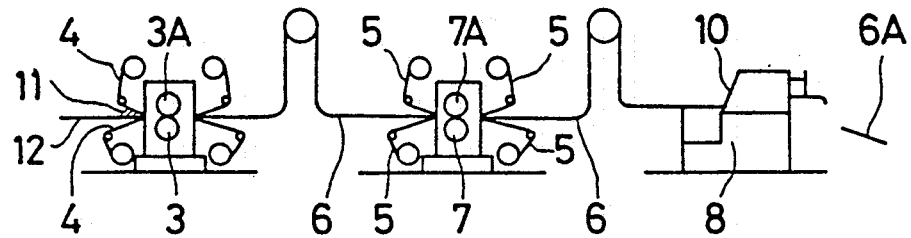
FIG. 3 is an explanatory view showing an example of the processes of producing the plate-shaped catalyst according to the present invention.

A multiplicity of plate-shaped catalysts 6A obtained by the process shown in FIG. 3 are piled up on one another by using the convex portions 2 and the concave portions 2A of the plate-shaped catalysts as the spacers as shown in FIG. 10. The plate-shaped catalysts are housed in a suitable frame member to thereby form a catalytic unit. In FIG. 10, a flowing direction of the exhaust gases is indicated by an arrow G. When the exhaust gases are passed through in a direction parallel to the wave-shapes as described above, a higher denitrating performance can be obtained. However, the passing direction of the exhaust gases in not limited to this, and an arrangement of the plate-shaped catalysts may be adopted wherein the exhaust gases are passed in a direction oblique to the wave-shapes or passed in a direction perpendicular to the direction G in FIG. 10.

Figure 12:
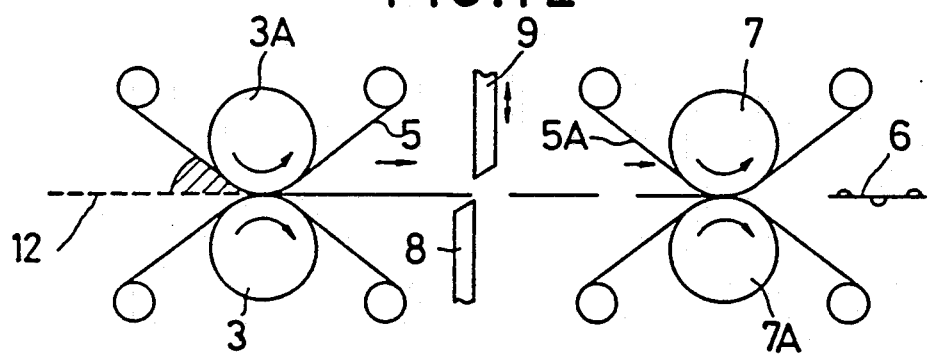
FIG. 12 is an explanatory view of the process showing a cutting machine provided between the coating rolls that coat the catalytic substance onto the expanded metal strip and the pressing rolls that press the expanded metal strip to form the wave-shapes and the convex and concave portions.
Figure 12A:
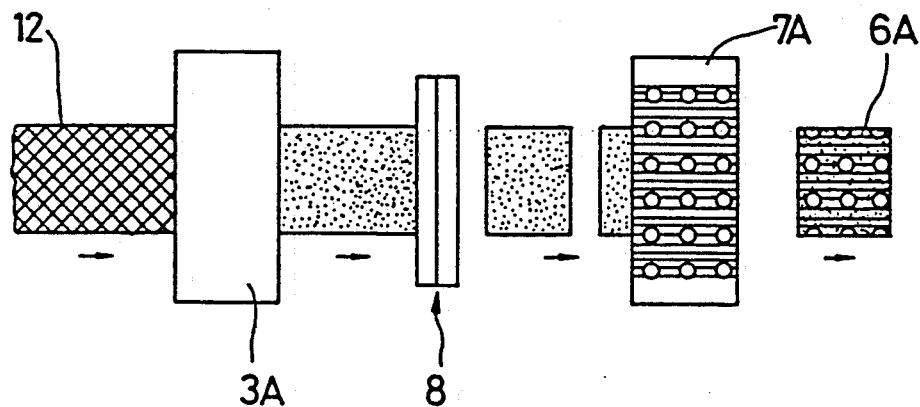
FIG. 12A is a plan view corresponding to FIG. 12.

Next, FIGS. 12 and 12A show a case where the cutting machine 8 is provided between the coating rolls 3 and 3A and the pressing rolls 7 and 7A. According to the present invention, no substantial change in size in the widthwise direction occurs due to the threading of the strip through the pressing rolls 7 and 7A, so that, even if a cutting machine is provided in front of the pressing rolls, a plate-shaped catalyst 6A having a constant predetermined shape can be produced.

EXAMPLE

As the base strip, there was used the expanded metal strip having the dimensions shown in FIG. 5. The strip was surface-roughened by spray-coating molten aluminum thereonto at a rate of 30 g/m$_2$. The expanded metal strip thus surface-roughened was coated thereon with a denitrating catalytic slurry (concentration of catalyst: 70 wt %) containing therein titanium oxide, vanadium oxide or molybdenum oxide as the catalyst, by use of the coating rolls (coating amount to the expanded metal strip: 77 wt %). Subsequently, the expanded metal strip was subjected to the pressing rolls shown in FIG. 9 (diameter of rolls: 157 mm; pitch of wave-shapes: 2 mm; depth of wave-shapes: 2 mm; height of conical convex and concave portions: 3 mm; outside diameter: 16 mm; R of vertex of cone: 3-4 mm; 20 pieces/roll; and zigzag arrangement), to thereby produce the plate-shaped catalysts having wave-shapes and the convex and concave portions according to the present invention. The plate-shaped catalysts thus obtained were piled up on each other to provide a catalytic unit as shown in FIG. 10. Exhaust gases were passed therethrough in parallel to the wave-shapes (in a direction indicated by the arrow G), and subjected to a denitrating test (AV (air velocity): 51 m/m, temperature: 350° C., $NH_3/NO_2=1.2$), using ammonia as the reducing agent. Furthermore, to evaluate the peel strength of the catalyst, a release amount of the catalyst was measured when the plate-shaped catalyst having the predetermined dimensions was dropped ten times from a height of one meter.

Figure 13:
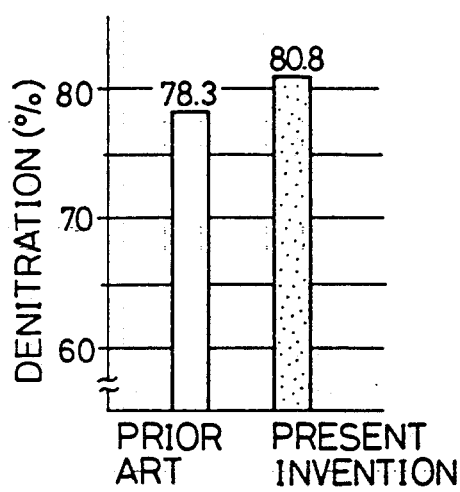
FIGS. 13 and 14 are charts showing the results of the denirating and peel strength tests, respectively, for plate-shaped catalysts constructed according to the present invention.
Figure 14:
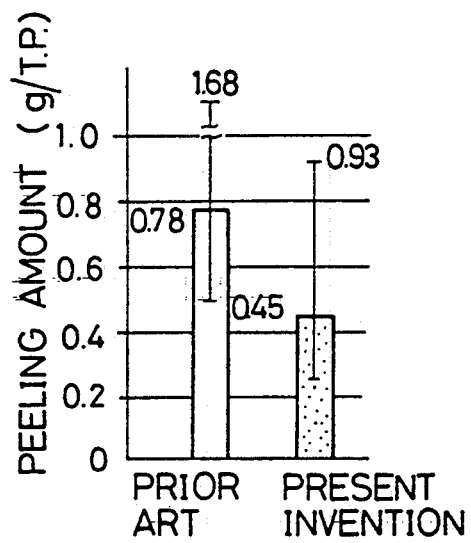

For comparison, a flat plate-shaped catalyst (the amount of coating onto the flat plate-shaped was 77 wt %) having v-shaped ridges was prepared, and subjected to the denitration test and the dropping test performed in the same manner as described above. FIGS. 13 and 14 show the results thus obtained. From the results shown above, the plate-shaped catalyst according to the present invention improved in denitration rate by about 2.5% (from 78.3% to 80.8%) and improved considerably in peel strength in the dropping test (averaged 0.78 g/T.P. (Total Pieces) was reduced to 0.45 g/T.P.) as compared with the conventional flat plate-shaped catalyst. In addition to the inprovements in the denitration rate and peel strength as described above, in the plate-shaped catalyst according to the present invention, the expanded metal strip can adopt the same width as the width of the plate-shaped catalyst which is the final product, whereby there is no need for considering the reduction in width when cutting the expanded metal strip due to the working, and whereby the cutting loss and handling of the expanded metal strip are improved, so that the usage of the base strip is decreased. Furthermore, when the base strips of the same dimensions are used, the present invention can produce a plate-shaped catalyst having a larger surface area in contact with the exhaust gases than the conventional one. The conical convex and concave portions provided on the plate-shaped catalyst do not form the channels for the exhaust gas flow as compared with the conventional plate-shapd catalyst, in which the channels are formed by the V-shaped ridges. Thus, the dispersion properties of the exhaust gases can be improved when the plate-shaped catalysts of the invention are used.

According to the present invention, the specific wave-shapes and convex and concave portions are formed on the plate-shaped catalyst, so that the usage of the expanded metal strip as the base strip can be reduced to save the raw material, and further, the surface area of the catalysts can be increased to improve the rate of reaction.

What is claimed is:

1. A plate-shaped catalyst, comprising:
    an expanded metal strip having roughened surfaces;
    said surface roughened expanded metal strip having a catalytic layer coated on each entire surface thereof;
    said expanded metal strip having the catalytic layer formed thereon further having convex and concave portions adjoining one another and separated by a predetermined distance; and
    the surfaces of said catalytic layer being formed with wave-shapes having a predetermined pitch.

2. A plate-shaped catalyst according to claim 1, wherein said catalyst is an exhaust gas denitrating catalyst.

3. A plate-shaped catalyst according to claim 1, wherein a pitch of openings formed in said expanded metal strip in a direction of expanding is about 2 mm, a pitch of openings arranged in a direction perpendicular to the direction of expanding is about 4.5 mm and a pitch of said wave-shapes is about 2 mm.

4. A plate-shaped catalyst according to claim 1, wherein said surface-roughened expanded metal strip is formed of one in which molten metal is spray-coated on said expanded metal strip.

5. A plate-shaped catalyst according to claim 1, wherein said wave-shapes formed on the surfaces of the catalytic layer are formed in a direction perpendicular to the direction of expanding of the said expanded metal strip.

6. A plate-shaped catalyst according to claim 1, wherein said wave-shapes are formed in a direction in parallel to the direction expanding of said expanded metal strip.

7. A method of producing a plate-shaped catalyst, comprising:
    a step of coating a catalyst substance on a surface-roughened expanded metal strip;
    a step of passing said expanded metal strip having the catalytic substance coated thereon through a pair of rolls having thereon wave-shapes arranged at a pitch of 1–3 mm and having a plurality of convex and concave pressing portions adjoining one another, said pair of rolls being provided such that said wave-shapes and said convex and concave pressing portions mesh with each other, to form convex and concave portions in the expanded metal strip and to form in the surfaces of the catalytic substance layer wave-shapes such that said expanded metal strip is not substantially deformed except for the formation of said convex and concave portions.

8. The method of producing a plate-shaped catalyst according to claim 7, wherein said catalytic substance is an aqueous slurry containing therein 70–90 wt % of an exhaust gas denitrating catalyst.

9. The method of producing a plate-shaped catalyst according to claim 7, wherein a pitch of openings on said expanded metal strip in a direction of expanding is about 2 mm, a pitch of the openings in a direction perpendicular to the direction of expanding is about 4.5 mm and a pitch of wave-shapes of the wave-shape rolls is about 2 mm.

10. The method of producing a plate-shaped catalyst according to claim 7, wherein said expanded metal strip is one in which molten metal is spray-coated onto said expanded metal strip.

11. The method of producing a plate-shaped catalyst according to claim 7, wherein said wave-shapes on the pair of rolls are arranged in a direction perpendicular to the axes of the pair of rolls and said expanded metal strip is fed into the pair of rolls in a direction perpendicular to a direction of expanding of said expanded metal strip.

12. The method of producing a plate-shaped catalyst according to claim 7, wherein said wave-shapes on the pair of rolls are arranged in a direction perpendicular to the axes of the pair of rolls and said expanded metal strip is fed into the pair of rolls in a direction parallel to a direction of expanding of said expanded metal strip.

13. The method of producing a plate-shaped catalyst according to claim 7, further including a step of cutting the plate-shaped catalyst between said step of coating a catalytic substance on said expanded metal strip and said step of passing said expanded metal strip through the pair of rolls.

* * * * *